Jan. 13, 1953 W. O. MORAN 2,625,342
SUPPORT FOR LINES AND THE LIKE
Filed Oct. 3, 1949 2 SHEETS—SHEET 1
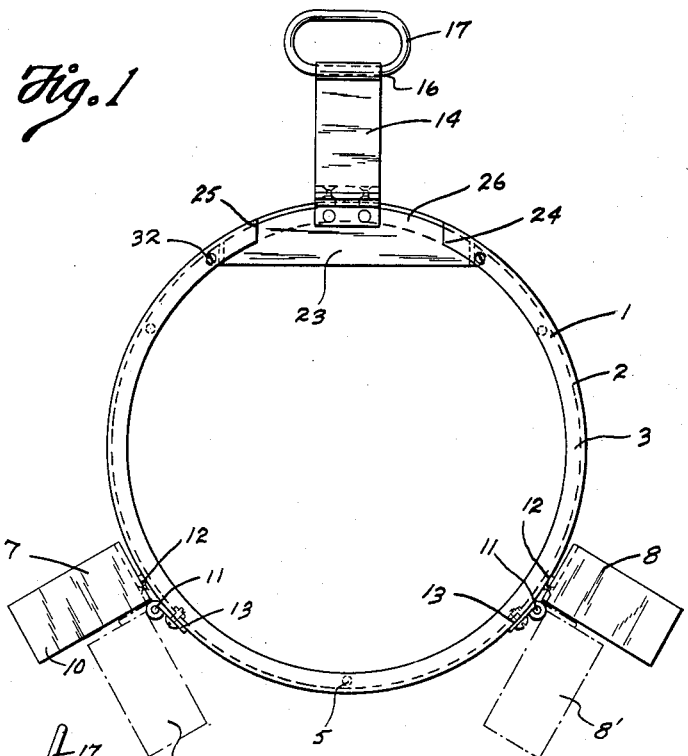
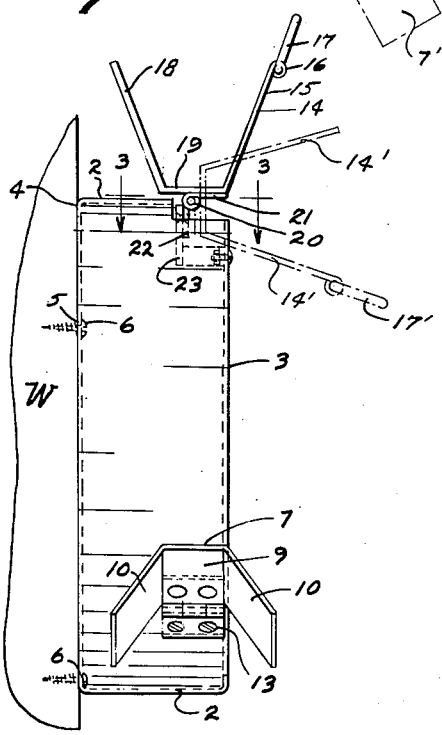
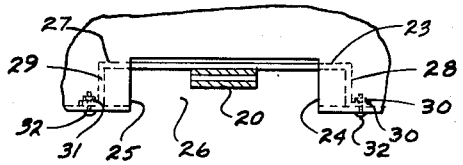
William O. Moran
INVENTOR.
BY Beale and Jones
ATTORNEYS Jan. 13, 1953     W. O. MORAN     2,625,342
SUPPORT FOR LINES AND THE LIKE
Filed Oct. 3, 1949     2 SHEETS—SHEET 2
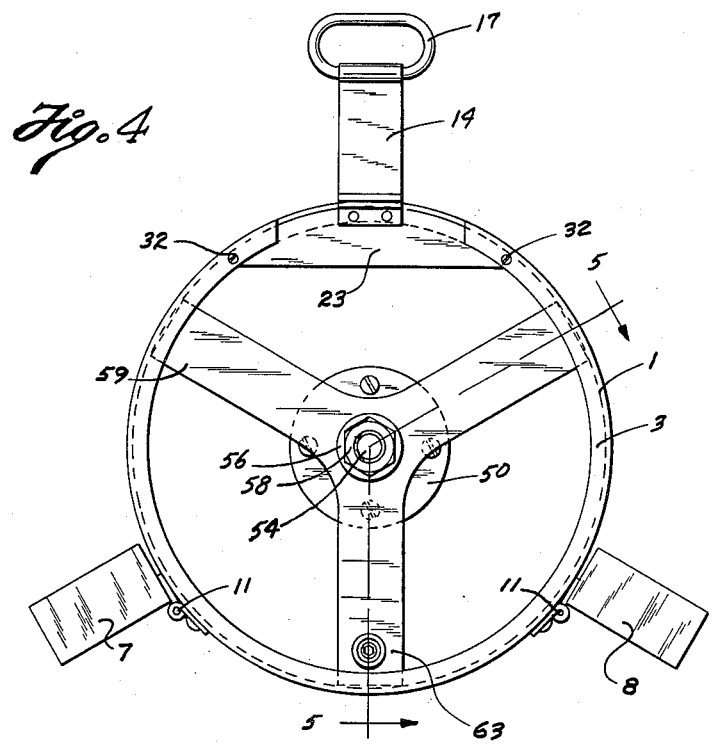
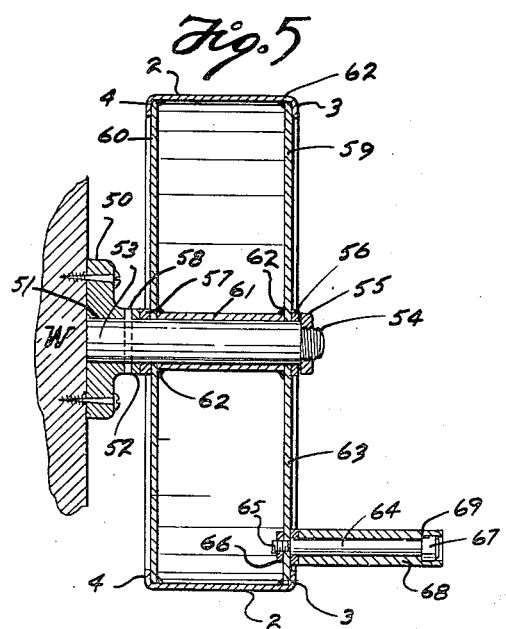
William O. Moran
INVENTOR.
BY Beale and Jones
ATTORNEYS Patented Jan. 13, 1953

2,625,342

UNITED STATES PATENT OFFICE 2,625,342

SUPPORT FOR LINES AND THE LIKE

William O. Moran, Tulsa, Okla.

Application October 3, 1949, Serial No. 119,298

5 Claims. (Cl. 242—86)

This invention relates to a device adapted to support coils of line, hose, or similar articles which may be coiled when not in use. The several forms of the invention are each adapted to be installed on a wall or door of a garage, tool house, coast guard station, ship, or other structure.

The prior art is cognizant of a number of devices adapted for coiling up or reeling up lines or hoses so that the articles may be put away with less use of space when not needed, but so far as I am aware, most of these devices are cumbersome and are adapted to be placed on the floor where they are in the way and are generally too cumbersome and uneconomic for widespread use.

The subject of the present invention is a support which may be manufactured very cheaply, which may be placed with extreme ease on a wall such as a tool house wall or a door such as a garage or bulk head door so that it provides ready accessibility to the supported hose, rope, or line whenever desired. A further feature of the invention is the construction of such a support in a manner which will permit the supported line or hose to be removed very quickly and practically automatically whenever need for haste arises. Therefore, one outstanding characteristic of the device is the associated means for discharging the supported line or hose onto the crook of the arm so that the hose, or line, still coiled, may be readily transported in an emergency such as in fires, or life-saving operations.

The invention, therefore, has for an object the provision of a support upon which a line or hose may be coiled smoothly and uniformly, and when not in use may be retained in such a uniform coiled position; yet when the need arises the coiled line or hose may be withdrawn from the support with a simple movement of one arm or hand, and the still coiled hose or line may be carried to the point of use without difficulty. A further object of the invention is the provision of a support which will permit the coiled line or hose to be withdrawn as in life lines or fire hoses without disturbing the coiled formation of the supported line or hose. A still further object of the invention is the provision of a support which can be placed at any desired level on a vertical wall or door so that the supported line or hose is at eye level or above and can be seen and reached in emergencies. Another object is the provision of a support which by virtue of its being placed on a wall or door may occupy no floor space and therefore economize the space normally used for line reels and hose reels.

The invention may be further understood by referring to the accompanying drawings wherein like reference numbers describe identical or like elements.

Figure 1 shows a front elevation of one form of the support when held in operative position on a suitable wall or door.

Figure 2 shows a side elevation of the form shown in Figure 1.

Figure 3 shows a detail, partially in cross-section, taken along the lines 3—3 of Figure 2.

Figure 4 shows a modification of the form illustrated in Figure 1 and differs from that modification in being adapted for rotation around a fixed support so that the line or hose may be coiled on the support.

Figure 5 shows a side elevation, partly in cross-section, as taken along the lines 5—5 of Figure 4.

Figure 1 shows an annulus or ring 1 preferably made of sheet iron, which may be galvanized or coated with any protective coating to make it more attractive, which has an annular surface 2 which define the walls of a cylinder. The outer extremities of the wall 2 are rolled inwardly to provide a front flange 3 and a rear flange 4, both of which extend inwardly toward the axis of the cylinder to a distance sufficient to provide noticeable stiffening, thereby imparting additional rigidity to the cylinder as well as to provide sufficient metal to accommodate apertures drilled therethrough for the purpose of attaching the flanges to such surface as may be necessary. At suitably spaced points around the surface of the rear flange 4 a plurality of holes may be tapped to accommodate wood screws or nails or whatever means may be necessary to affix the rear flange 4 firmly against and to a supporting vertical surface such as the wall W shown in Figure 2 of the drawings. As shown in Figure 2 the rear flange 4 is affixed to the wall W by means of screw 6.

Affixed to the outer surface 2 of the cylindrical support are a pair of spaced hinged trough members 7 and 8. These trough members may be and are substantially identical and may desirably be formed of sheet metal bent in the form of a trough having a base 9 and outwardly diverging sides 10, 10. Each of the troughs 7 and 8 is affixed to a hinge 11; one leaf 12 of the hinge is affixed to the base 9 of the trough and the lowermost leaf 13 of the hinge is affixed to the outer surface 2 of the cylindrical support. Supports 7 and 8 will preferably be affixed to the cylinder in such a manner that the outer edge of the base of each support is coincidental with the outer flange 3 of the cylinder. The troughs 7 and 8 should be so placed as to permit them to occupy a support position in which their respective bases are substantially tangent to the periphery of the cylinder 2, and yet they should be free to swing downwardly around the hinge pins so as to occupy discharge positions such as shown as 7' and 8' in Figure 1 of the drawings.

Preferably at the top of the cylindrical support 1, I affix another trough 14 constructed somewhat differently from the aforementioned troughs 7 and 8 with respect to the hinge support thereof. Preferably trough 14 should be somewhat deeper than the lower troughs 7 and 8, yet the side walls 15 and 18 of this trough will diverge outwardly and upwardly similar to the corresponding sides of the troughs 7 and 8. The outer wall 15 of trough 14 preferably has its upper edge rolled as at 16 to provide a seat for a bail 17.

The lower outer edge of wall 15 of trough 14 should be substantially in the same plane as the flange 3 at the front of the support 1. The base 19 of trough 14 is desirably affixed to one of the leaves 21 of a hinge 20. The other leaf 22 of the hinge is attached to a support member 23.

Support member 23 may preferably be formed of metal of somewhat heavier gauge than the remainder of the support so as to provide greater strength. Member 23 is formed with a main bridge member or strap 27 adapted to be disposed substantially vertically within the upper portion of the cylinder 1; each end of the bridge member 27 is turned at right angles forwardly toward the front of the support as at 28 and 29 and again turned outwardly to provide a pair of flanges 30 and 31. Flanges 30 and 31 are adapted to be held firmly against the inner surface of front rim 3 by means of suitable rivets or nuts and bolts 32. It will be observed that the portions of the front flange 3 are cut off as shown at 24 and 25 so as to present a discontinuous surface or recess 26. This recess 26 permits the upper trough 14 to swing outward and downward through a full arc of 90 degrees or more for a purpose to be explained hereinafter.

Figures 4 and 5 of the drawings show a somewhat different modification of the structure hereinabove described, the difference being essentially the addition of provisions which will permit the cylinder 1 to be rotated and thus coil up a line of hose or the like. As shown in Figure 5, there is provided a pedestal or base 50 adapted to be affixed to a vertical wall or door W by means of screws or nails. This base may be made of metal or of wood, if desired. The base 50 is provided with a central interior bore 51 of a size adapted to accommodate a suitable shaft or rod 53. The outer portion of the base 50 is extended into a cylindrical neck 52 which likewise has formed within it the bore 51. There is provided a shaft 53 which desirably may be a metal rod, the outer end of which, 54, is threaded to accommodate a suitable nut 55. To permit rotation of the support 1 around a central axis thereof, suitable washers 56 and 57 are provided adjacent the nut 55 and the end of the neck 52 of the base, respectively. To prevent rotation of the shaft or rod 53 a key or pin 58 may be passed through the neck 52 of the base and through a suitable aperture drilled through the rod or shaft 53.

Suitable brace members 59 and 60, which may be of any desired shape but which as shown in Figure 4 of the drawings are in the form of spiders, may be suitably stamped out as desired and are provided at the front and rear edges of the main cylinder of the support. Each of these spiders will desirably have a central orifice of a size adapted to accommodate the pin or shaft 53, or for further stiffening purposes a cylindrical hub may be placed around the shaft or pin 53, this hub having its ends contacting the interior faces of the respective spiders 59 and 60. The contacting edges of the spiders with the outer rim 2 of the cylinder 1 may be suitably welded for strength and rigidity, and similarly the edges adjacent the hub 61 may be welded; all welds being shown generally as 62. One of the legs of the spiders, this being the leg 63 as shown in Figure 4, may have drilled through it a suitable orifice through which may be inserted the threaded end 65 of a pin 64. A nut 66 may be utilized to secure the threaded end of this pin 64 in operative position. Desirably the outer end of the pin 64 is enlarged to provide a crown 67 which has a somewhat greater diameter than the diameter of the pin. There may be placed over the pin 64 a wooden cylinder or cover 68 which has a counter-sunk outer end 69 adapted to accommodate the crown 67 of the pin, thereby holding the wooden cylinder in place around the pin and yet permitting rotation of the wooden cylinder without attendant rotation of the pin itself. This combination of elements is to provide a handle which will permit the entire support to be rotated around the shaft or rod 53.

The mode of operation of the invention herein described requires little explanation. It may be noted that the main support or cylinder 1, in the modification of Figures 1, 2, and 3, is permanently affixed to a wall or door W. When so affixed the trough 14 will be disposed at the top of the support. After the support has been affixed to the wall, a hose or line may be coiled around the periphery of the support and within the recesses formed by each trough 14, 7, and 8. Desirably the coiling should be performed so as to force the hinged troughs 7 and 8 to assume the positions shown in full lines on Figure 1, while trough 14 will assume the position shown in full lines in Figure 2. After the line has been completely coiled it may be left in position until used. When it is desired to use the hose or line the operator need only reach up, grasp the bail 17 with one hand and pull down on the bail. Pulling down on the bail depresses trough 14 to the position shown in dotted lines as 14' in Figure 2, and when that position is reached the coil of line or hose falls into the naturally formed V of the forearm and upper arm of the hand which is grasping the bail 17. The hose falls in its completely coiled position, and the user may then carry it around without difficulty to the place of intended use. It should be explained that when trough 14 is depressed to the dotted lines shown as 14' in Figure 2, the troughs 7 and 8 naturally fall downward to the positions shown in dotted lines as 7' and 8' on Figure 1, thus the coil of hose or line is completely freed from its support. For the best results it has been observed that troughs 7 and 8 should be spaced from each other by a peripheral distance, not greater, and preferably less than, the peripheral distance from trough 14 and either of troughs 7 and 8. By peripheral distance it will be understood that the distance is measured by arcs along the circumference of the circle bounding outer edge 2 of the cylindrical support 1.

Reverting now to Figures 4 and 5 of the drawings, the manner of use is identical with that of Figures 1, 2 and 3, except that by using the handle 68 the entire cylinder may be rotated and the hose or line coiled into the spaces within the troughs 14, 7 and 8 without requiring manual coiling as is necessary in the fixed modification.

The advantages of a support for a hose or line which may be affixed to a vertical wall or door will be readily apparent to the average gardener, whose hose, when he wishes to use it, is invariably in a poorly coiled position on the floor or looped heterogeneously over a nail. Any gardener knows the annoyance of unkinking and straightening out his hose before use. There are other advantages which are not so readily apparent. In certain parts of the oil fields or in other industrial plants, there is always a danger of fire, and it is quite desirable to have an appropriate length of hose spotted and in readiness to use in order to combat the fire. Under such circumstances, it is extremely advantageous to be able to get the hose and carry it to the necessary water tap with the least possible delay. The arrangement which is made clear from the foregoing description permits the hose to be taken off the carrier in a matter of seconds and carried, fully coiled, to the place of use.

However, the present invention is not limited in use to the support of hoses, but may be used in other places and under other circumstances where it is desirable to support a coil of any kind of line. An example of this is in life saving stations, or coast guard stations, where the line connected to a life preserver is generally coiled up in readiness for use. The present arrangement will permit the line to be coiled properly, supported in readiness position, yet be quickly removed and carried where needed. When removed from the support the line, properly coiled, may be carried over either arm in such a manner that it will uncoil when the life preserver is thrown out without the raveling and kinking which so frequently attends the use of an improperly coiled line. There will be other uses which will become apparent to those skilled in the art, such as for example on ship board where it is desired to coil and store casting lines or light mooring lines, and numerous others.

While the modifications shown are particularly adapted for fabrication from sheet metal stock, it will be understood that without departing from the spirit of this invention the essentially cylindrical support 1 could be formed of two or more parallel annular rings of heavier metal, cast or suitably shaped, and joined by a plurality of transverse, annularly disposed stiffening rods. On such a structure ears could be provided for fastening the structure to the wall and the hinged troughs could be suitably mounted on either the rings or the transverse stiffening rods.

I claim:

1. A support for coiled lines comprising a cylindrical support member having an inwardly turned flange at the rear end thereof and an unobstructed front end, means for affixing the flange at the rear end to a vertical surface thereby maintaining said support in a fixed position with its central axis normal to the plane of the vertical surface, and a plurality of spaced trough members hingedly affixed to the cylindrical support member in a position adjacent the outer circumferential periphery of the cylindrical support member and adjacent the front unobstructed end thereof whereby the trough members are adapted to support in their, at rest, position circumferentially around the cylindrical support member a coiled length of lines in a position coaxial around said cylindrical support member, all but one of said trough members being affixed to the cylindrical support member adjacent the front unobstructed end thereof at points located below the central axis of the cylindrical support member, said lowerly located trough members being hingedly attached to the cylindrical support member to permit downward hinging movement to a coil-discharging position responsive to gravitational forces to discharge said coiled length of line, as such, over the front unobstructed end of said cylindrical support upon tilting the remaining one of said trough members toward the front unobstructed end and downward.

2. The device defined in claim 1 wherein a trough member is affixed at the top of the cylindrical support and adjacent the front thereof by means of a hinge, the pin of which is disposed substantially tangent to the periphery of the cylinder and substantially normal to the central axis of the cylinder.

3. The device defined in claim 1 wherein at least two of the trough members are affixed on the periphery of the cylinder at points below the central axis of the cylinder by means of hinges the pins of which are disposed substantially along the outer circumferential peripheral surface of the cylinder and substantially parallel to the central axis of the cylinder.

4. The device defined in claim 1 wherein the top portion of said cylindrical support member at the front unobstructed end thereof has a recess therein, a bracket positioned within and attached to said cylindrical support member adjacent said recess and extending substantially normal to the central axis of said cylindrical support member, a hinge attached to said bracket with the pivotal pin thereof extending substantially tangent to the peripheral surface of said cylindrical member generated in continuing said peripheral surface of the cylindrical support member over said recessed portion, said remaining one of the troughs being attached to said hinge so as to tilt toward said forward end of the cylindrical support member and downward within said recess.

5. A support for coiled lines, comprising a cylindrical support member, means for supporting said cylindrical support member with its axis in a horizontal position, and a plurality of spaced trough members hingedly affixed to the outer periphery of said cylindrical support member adjacent one end thereof whereby the trough members are adapted to support in their, at rest, position a coiled length of lines in a position coaxial with said cylindrical support member, all but one of said trough members being affixed to the cylindrical support member adjacent one end thereof at points located below the central axis of the cylindrical support member, said lowerly located trough members being hingedly attached to the cylindrical support member to permit downward hinging movement to a coil-discharging position responsive to gravitational forces to discharge said coiled length of lines, as such, over the end of said cylindrical support adjacent which said troughs are affixed upon tilting the remaining one of said trough members toward the end of said support adjacent which said troughs are affixed.

WILLIAM O. MORAN.

REFERENCES CITED

The following references are of record in the file of this patent:

UNITED STATES PATENTS

| Number | Name | Date |
|---|---|---|
| 83,270 | Fenner | Oct. 20, 1868 |
| 458,572 | Gedge | Sept. 1, 1891 |
| 538,939 | Warren | May 7, 1895 |
| 2,039,915 | McCoy | May 5, 1936 |
| 2,231,001 | Engstrom | Feb. 11, 1941 |
| 2,427,801 | McKee | Sept. 23, 1947 |